Patented Feb. 18, 1947

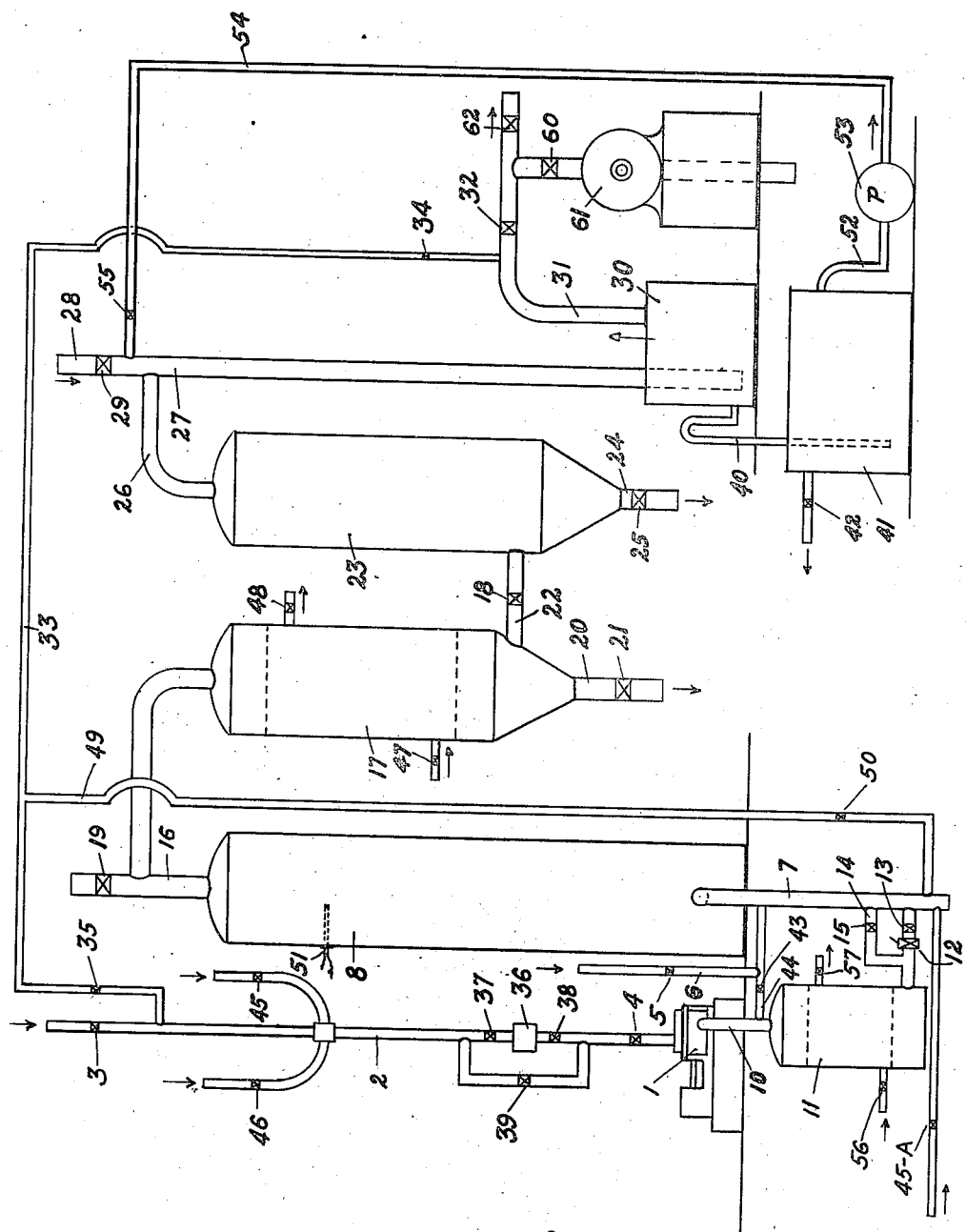

2,415,904

UNITED STATES PATENT OFFICE 2,415,904

METHOD OF OXIDIZING HYDROGEN SULFIDE

William W. Odell, El Dorado, Ark., assignor to Lion Oil Company, a corporation of Delaware Application November 26, 1942, Serial No. 467,064

4 Claims. (Cl. 23—177)

This invention relates to the process of making oxidation products from oxidizable matter, preferably by the controlled combustion of the said matter while under pressure greater than atmospheric pressure. In particular it has to do with oxidation of oxidizable matter in the vaporous phase in an internal combustion engine. In Patent No. 1,939,018, which was granted to me December 12, 1933, I have shown the benefits derived from controlled combustion in an internal combustion engine, particularly where incomplete combustion was promoted. This invention has to do with special cases and with the employment of mixtures initially charged under superatmospheric pressure into the combustion chamber of a device adapted to promote high-pressure combustion reactions. This invention also relates to the employment of an excess of the oxidizing reactant above the amount required to make a chosen end product. This invention also deals with the recirculation of reaction products and the discharge of reaction products under superatmospheric pressure.

One of the objects of this invention is the production of end products which are not appreciably contaminated by undesirable products of incomplete combustion. Another object is the catalysis of reaction by the use of some of the end products produced. Another object is the initiation of combustion in mixtures which are slow in starting. Other objects will become manifest from the disclosures made herein.

In the combustion of hydrogen sulphide under superatmospheric pressure conditions, such as by combustion in an internal combustion engine, sulphur is formed when the supply of oxygen is limited, substantially according to the reaction shown in Equation 1.

(1) 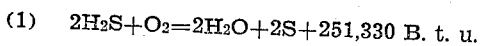 B. t. u.

This reaction, in a sense, is reversible and at high temperatures sulphur combines with water to form sulphur dioxide and hydrogen sulphide by an endothermic reaction, therefore there is a tendency for the reaction of sulphur with water vapor under pressure and at high temperatures forming hydrogen sulphide and sulphur dioxide. Again, in the production of sulphur dioxide by the combustion of hydrogen sulphide substantially in accordance with the reaction shown in Equation 2, an excess of air or oxygen-bearing gas is required in order to produce sulphur dioxide of a high degree of purity, that is, sulphur dioxide which does not contain admixed therewith products of the incomplete combustion of hydrocarbons which are commonly associated with commercial grades of hydrogen sulphide available for combustion purposes.

(2) 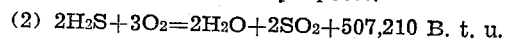 B. t. u.

Accordingly I prefer to employ, in the combustion of hydrogen sulphide for the production of a good quality of sulphur dioxide, more oxygen than is indicated in Equation 2 and more than is required for the theoretical complete combustion of other combustible matter which may be associated with the commercial grade of hydrogen sulphide; this, I have found, it is necessary to do in making a high grade sulphur dioxide. The sulphur dioxide made in this manner can be prepared for use in making sulphur trioxide with very little effort by ordinary gas cleaning methods; it is suitable for other chemical reactions which require clean sulphur dioxide. Although pressure favors Reaction 2, it is a fact that hydrogen sulphide has a rather low ignition temperature and therefore excessive supercharger pressures are not indicated in promoting this reaction. It is beneficial, however, to discharge the reaction products under superatmospheric pressure and to recirculate some cooled reaction products in promoting the reaction. Applicant is aware of the fact that normally the presence of reaction products in a reacting mixture is not favorable to completion of reaction but in this particular case benefit is derived from the presence of relatively small amounts of reaction products in the initial combustible mixture. This may be explained by the fact that sulphur dioxide is itself a reactant which combines with hydrogen sulphide at low temperatures, thus it may function as the catalyst to the reaction. It will be observed when reaction products are discharged from an internal combustion engine at superatmospheric pressure there will automatically remain in the cylinder a definite amount of reaction products, which amount is proportional to said pressure. In cases where it is desirable to have present in the combustible mixture in the engine cylinder some of the entire mixture of end products formed, it is only necessary to control the discharge pressure from the exhaust of said engine in order to control the amount of said products in said combustible mixture, within certain limits.

Another example of the benefit to be derived from recirculation of one of the end products is indicated by the reaction shown in Equation 3, in which hydrogen sulphide reacts with sulphur dioxide forming water and free sulphur.

(3) $2H_2S + SO_2 = 2H_2O + 3S + 123,380$ B. t. u.

Thus the sulphur dioxide produced by the combustion of hydrogen sulphide as indicated by Equation 2 can be recirculated and used as the oxidizing agent as indicated in Equation 3 for the production of elemental sulphur either alone or in the mixtures with oxygen or air. When sulphur dioxide, produced according to Equation 2 wherein air is employed as the oxidizing agent, is used as the oxidizing agent in the reaction of Equation 3 along with the nitrogen associated therewith, the dilution of the reactants with nitrogen will be greater in Equation 3 than in Equation 1 but the diluent per unit of sulphur produced according to Equation 1 is the same as that of Equation 3. Although high pressure does not favor Reaction 3 taking place from left to right at high temperatures, it is definitely true that at temperatures not far from the boiling point of the sulphur definite benefits are obtained by the use of pressure, that is, pressure favors the reaction under the latter set of conditions. As noted above, it is preferable in carrying out the reaction of Equation 3 to use some oxygen or air with the sulphur dioxide in addition to the amount of oxygen shown in said Equation 3 for the purpose of burning the impurities normally present in commercial hydrogen sulphide. I have found that in the production of elemental sulphur from hydrogen sulphide, accompanied by the generation of power, it is advantageous to burn substantially ⅓ of the total hydrogen sulphide employed for the purpose, in the cylinders of an internal combustion engine substantially according to Equation 2 by employing an excess of oxidant, subsequently mixing the remainder of the hydrogen sulphide, preferably cleaned and substantially free from contamination by hydrocarbons, with the hot reaction products from Equation 2, forming sulphur according to Equation 3 by reactions occurring in a reaction chamber provided for the purpose, said excess oxidant being preferably sulphur dioxide.

The accompanying figure shows in elevation, but in a very diagrammatic manner, means wherein my invention can be practiced; it shows the hook up of the gas supply to an engine with the means for recirculation of an end product, means for promoting combustion in a combustion chamber wherein reactions such as that shown in Equation 3 can be conducted, means for cooling the products, condensing condensible products and removing same, a mist extractor, and means for causing substantially complete reaction of reactants present in the cooled gas which are capable of further reaction.

In the figure, the engine 1 has connected therewith a fuel and oxidant supply line 2, with main fuel valve 3, and engine supply valve 4; the exhaust discharge line 10 is connected with pressure tank 11 which is a surge tank and which has a pressure release valve 12 which can be set to discharge at a predetermined pressure, through valve 13 into line 7 leading to chamber 8, which is a reaction chamber adapted for conducting secondary reactions at elevated temperatures. Valve 5 controls a supply of preferably clean combustible reactant flowing through conduit 6 to chamber 8, mixing with the exhaust gas in line 7 as it passes into chamber 8. Valve 15 is used as a means of bypassing valve 12. Offtake 16 from chamber 8 leads to a condenser 17 having an inlet for a cooling fluid with valve 47, and an outlet for said fluid with valve 48. Chamber 17 is a waste heat economizer which is a boiler when temperature conditions warrant. Similarly, reservoir 11 is a heat-exchange cooler, the cooling action being intensified as cool fluid is circulated therethrough, 56 and 57 being the inlet and out valves for the cooling fluid. Condensed products pass out of 17 through offtake 20 and valve 21, whereas the vaporous products can leave 17 through 22 and valve 18 into the mist extractor 23, which extractor has an offtake 24 for matter removed from the gas stream therein with control valve 25. The offtake 26 for gases from 23 connects with line 27 into which a cooling fluid may flow through line 28 and valve 29; line 27 conducts fluids into wash box, or separator box, 30, the gases discharging therefrom through 31 and valve 32, whereas the other products pass out through 40 and receiver 41. Means for recirculating into the engine cooled productions of reaction are shown by line 33 and valves 34 and 35. Means for supplying fuel gas to the surge tank 11 is shown by valve 43 and line 44 which connects with line 19. Means for bypassing supercharger 36 are shown by valves 37, 38, and 39. Supply lines for oxidants are shown with control valves 45 and 46; valve 45 will be considered as the air supply valve and 46 as another oxidant control valve. Valve 45—A controls a supply of secondary air for control of reactions occurring in chamber 8 and for controlling the temperature in that chamber. The line 49 for return of reaction products to chamber 8 has a control valve 50. Thermocouple connections are shown at 51 in chamber 8, and means for recirculation of wash liquor from 41 are indicated by pipe 52, pump 53, pipe 54, and valve 55. Exhaust 61 withdraws gases from 32 through 60 except when they are discharged entirely under their own pressure through valve 62.

One example of procedure, producing sulphur dioxide, and employing hydrogen sulphide gas containing carbon dioxide and a small percent of hydrocarbon gas is as follows:

*Example*

Referring to the figure, valves 3, 45, 37, 38, and 4 are opened and supercharger 36 started. The supply of air and hydrogen sulphide mixture are adjusted so that a small excess of air is present in the fluid supplied to engine 1. The engine is started and the exhaust gas passes out through 10 into surge tank 11, where the gas has a brief period to soak at a temperature above ignition temperature of any of the fuel components. The exhaust gas passes out of 11 through valves 12 and 13 substantially at the same rate it is produced, into chamber 8 which is filled with contact solids adapted to cause mixing of the gas stream at an elevated temperature; the said contact material becomes heated by the contact with the hot exhaust gas. Any lubricating oil vapors are burned out completely in this chamber. In starting, the solids in chamber 8 can be heated by burning fuel therein, admitting it through 5 and 6 and introducing air through the auxiliary supply valve 45—A. The gas stream, comprising sulphur dioxide and nitrogen with a very small relative amount of carbon dioxide passes out of chamber 8 serially through 16, cooler-condenser 17, offtake 22, valve 18, mist extractor 23, offtake 26, pipe 27, wash-box 30, offtake 31 and valve 32 to suitable recovery equipment.

In this example the supercharger pressure should not be high because of the low ignition temperature of hydrogen sulphide, unless the concentration is low and the percent of inerts present is high, and likewise the valve 12 should be set in this example so that the back pressure on the engine is not great. A small amount of reaction products are preferably recirculated through valve 34, line 33 and valve 35 to the extent it is found to be beneficial, which varies with different raw fuel gases, that is, with hydrogen sulphide from different sources and of different degrees of purity. The sulphur dioxide made as above is suitable for use in the production of sulphuric acid or other purposes.

When it is desirable to recover elemental sulphur a slight modification of procedure accomplishes the purpose, as follows: Burn the gas in the engine as described and for each volume of hydrogen sulphide thus burned somewhat more than 2 volumes of preferably clean hydrogen sulphide gas are introduced into chamber 8 as a continuous stream through valve 5, and lines 6 and 7. Reaction occurs in chamber 8 substantially in accordance with Equation 3. This reaction is exothermic, hence the temperature of the solids in chamber 8 can be maintained at a level above 500° C. Because the concentration of hydrogen sulphide in the various commercially available grades of that material varies over an appreciable range it is necessary, for best results, to provide means for preventing the temperature in chamber 8 from rising too high; this is accomplished by the recirculation of effluent gas from wash-box 30, which passes through valve 34, lines 33 and 49, and valve 50. The amount of this recirculation depends on the temperature in chamber 8 as indicated by a pyrometer which is connected by the usual leads to thermocouple indicated at 51. As the temperature rises above 650° to 700° C. valve 34 is opened and valve 50 is partly opened while valve 32 is throttled until the recirculated cool effluent gas, which is substantially all nitrogen, is sufficient to prevent any further rise in temperature. Even at this temperature the reactants will not completely react, hence the fluid stream leaving chamber 8 through 16 contains sulphur vapor and some unreacted sulphur dioxide and hydrogen sulphide. As the stream passes into and through condenser 17 the sulphur vapor condenses and the unreacted sulphur gases react further generating additional heat; the total sulphur formed and condensed is withdrawn from 17 through offtake 20 and valve 21, whereas the gas stream passes out of 17 through 22 and valve 18 into the mist extractor which is at a temperature of 225° C. or more, but below about 300° C. wherein the mist sulphur is caused to separate and is removed through offtake 24 and valve 25. The fluid stream from 23 passes out through 26 and into pipe 27 where it is joined by an atomized water stream from 28 and valve 29. The combined stream passes into wash-box 30 where additional sulphur in a fine state of solid subdivision is obtained. The effluent gas stream passes out of 30 through 31 and 32 except the portion recirculated through 34.

It is desirable that the air be used in excess with the fuel supplied the engine because, if there is any free sulphur in the gas from the exhaust it may combine with iron by a strongly exothermic reaction at the temperature of the exhaust gas. It is advantageous to proportion the fuel and inerts supplied to the engine so that excessively high temperatures are not obtained in the exhaust gases; the temperature should be less than that which prevails in the combustion of methane with air, for example, to minimize iron-sulphur reactions.

The power available through utilization of the heat of combustion of the reactant hydrogen sulphide is more than sufficient to liquify or otherwise purify the portion of said hydrogen sulphide which is caused to react with sulphur dioxide in chamber 8. The impurities initially present in the hydrogen sulphide supplied to the engine are readily burned to the harmless end products, water and carbon dioxide, but when an appreciable amount of hydrocarbon impurities are present in the hydrogen sulphide gas supplied to chamber 8, either the solid contact material in chamber 8 should be maintained at a higher temperature than otherwise or an appreciable excess of air must be used in order to eliminate the impurities by combustion. It is preferable to clean the portion of hydrogen sulphide gas supplied to chamber 8 for the purpose of producing sulphur by the reaction shown in Equation 3, in order to minimize the use of excess oxygen in chamber 8 when making elemental sulphur.

Although it is believed that the foregoing description is sufficiently clear so that one skilled in the art can practice the invention using oxidizable sulphur gases, attention is called to the fact that small amounts of both hydrogen sulphide and sulphur dioxide pass out of the mist extractor 23 of the figure in the gas stream through 26. Further reaction between these reactants is promoted in solution. The use of bauxite or other catalyst in promoting this phase of the process is helpful and also the recirculation of water containing a small amount of colloidal or finely divided sulphur in suspension through 52, pump 53, pipe 54 and valve 55; this water may be a brine solution which helps in coagulation of the sulphur particles. Solids suspended in the liquid overflowing from wash-box 30 into settling tank 41 are removed periodically as they accumulate sufficiently therein. Sulphur collected in this manner and freed from excessive amounts of water is suitable for various agricultural uses. Because of the fine state of subdivision of sulphur prepared in this manner, its use in various types of sprays makes possible a more uniform distribution of sulphur over a large surface area than is attainable with ground rock sulphur.

When a combustible gas is mixed with oxygen, its ignition temperature is lower than when it is mixed with air. Likewise the ignition temperature of the gas when appreciably diluted with inerts is higher than straight gas-air mixtures. When combustion reactions are carried out in appreciably diluted mixtures of an oxidant and a combustible vaporous or gaseous reactant, appreciably high initial pressures can be employed in promoting combustion as described. Thus, with dilution of reactants, and when promoting those reactions which give a decrease in volume of products by oxidation, or promoting reactions which do not give an increase in gas volume by combustion, it is possible to (a) Employ high initial compression, (b) Cause reaction to occur without a great increase in pressure in the combustion zone of an engine, and (c) Cause reaction to occur without an excessive rise in temperature of the reacting mixture. In other words incipient combustion may be applied to a condition of reaction which is approached under these conditions. This type of combustion is favorable for the maximum yield of certain products which tend to decompose at very high temperatures. For example, aldehydes are produced from olefins by oxidation which is accompanied by a decrease in volume, whereas the complete combustion of ethylene in air is not accompanied by any change in volume as will be noted by equation 4 as follows:

(4)     $C_2H_4 + 3O_2 = 2CO_2 + 2H_2O$

The higher olefins, upon complete oxidation in air, give an increase in volume. It will become evident that by promoting reactions at high pressure and in such dilution that the heat of reaction is not sufficient to decompose reaction products of incomplete combustion an appreciably high yield of the latter products can be obtained. When oxygen is not in excess the yields of aldehydes, alcohols, acids and certain other products are favored by the promotion of the incipient combustion quickly at high pressure and at not excessive temperatures. Moisture and carbon dioxide are good diluents, probably because of their high heat capacity. When these diluents are used along with air the oxidants are in excess although the oxygen is not in excess of that required to promote a favorable yield of the desired end products. In producing products of this nature in the practice of this invention, the reaction products are caused to pass, as described above, through the system, however secondary combustion is not always promoted in chamber 8 as was described in the production of sulphur. Some types of chlorination can be conducted in this manner, namely by promoting that type of oxidation in chamber 8.

Other examples can be cited but it is believed that the foregoing description is sufficient so that one skilled in the art can practice the invention in promoting other reactions which are in effect oxidation reactions and which are favored by pressure and moderate elevation of temperature for a brief period. It is considered that oxidants include oxygen, air, halogens, carbon dioxide, sulphur dioxide and other substances having the property of combining with another gaseous or vaporous reactant with the generation of heat by the oxidation of the latter substance.

Before defining my claims, it is perhaps well to relate that olefins and certain other reactive carbon compounds combine with sulphur dioxide additively, and that when the mixture supplied to the engine combustion chambers is dilute and the supercharge pressure appreciable, the valuable oxidation products include not only oxy and hydroxy compounds but organic sulphur compounds as well. It is decidedly advantageous to employ a plurality of oxidants in such cases, including air, proportioning them so as to obtain the optimum yields of the products sought, which is done by trial. The diameter and stroke of the pistons, the temperature of the cooling fluid used in the engine cooling system, and other variables have an influence on results. It is quite essential in most applications of my invention that the exhaust gases be substantially free from entrained carbon, hence the preferred method of operating is to so adjust operating variables that no appreciable amount of carbon is formed, unless carbon is one of the end products desired.

Having described my invention so that one familiar with the art can practice it, I claim:

1. A process of treating hydrogen sulphide which comprises initially compressing the hydrogen sulphide and a molecular excess of an oxidizing gas over the amount theoretically required to produce complete oxidation, introducing the unreacted compressed gaseous mixture into a cylinder of an internal combustion engine under superatmospheric pressure, completely oxidizing the reaction mixture within the said cylinder while under compression whereby $SO_2$ is obtained substantially free from incomplete reaction products, withdrawing the resulting gases including $SO_2$ from the cylinder under superatmospheric pressure, cooling said withdrawn gases, and recirculating a portion at least of said cooled gases through the internal combustion engine together with additional $H_2S$ and a molecular excess of oxidizing gas, the $SO_2$ in said recirculated gas serving as a catalyst for the oxidation reaction.

2. A process as set forth in claim 1 wherein the oxidizing gas is atmospheric air, and the nitrogen in the recirculated gas serves as a diluent to prevent excessively high temperatures in the gases withdrawn from the cylinder.

3. A process as set forth in claim 1 wherein $H_2S$ is added to the exhaust gases withdrawn from the cylinder, and is reacted with the $SO_2$ contained therein to produce elemental sulphur, which sulphur is separated from the gases before recirculation through the cylinder.

4. A process as set forth in claim 1 wherein a hydrocarbon is introduced into the cylinder along with the $H_2S$ and a sufficient quantity of oxidizing gas to produce complete combustion within the engine cylinder.

WILLIAM W. ODELL.

REFERENCES CITED

The following references are of record in the file of this patent:

UNITED STATES PATENTS

| Number | Name | Date |
|---|---|---|
| 2,003,442 | Hechenbleikner | June 4, 1935 |
| 1,000,732 | Hausser | Aug. 15, 1911 |
| 1,678,630 | Bahr | July 31, 1928 |
| 2,258,305 | Stirlen | Oct. 7, 1941 |
| 1,939,018 | Odell | Dec. 12, 1933 |
| 1,586,508 | Brutzkus | May 25, 1926 |
| 1,546,048 | Vogel | July 14, 1925 |
| 1,917,351 | Young | July 11, 1933 |

FOREIGN PATENTS

| Number | Country | Date |
|---|---|---|
| 5,960 | British | 1883 |
| 194,879 | German | Jan. 30, 1908 |
| 237,257 | British | Oct. 14, 1926 |
| 609,931 | French | May 22, 1926 |
| 94,914 | Swiss | June 1, 1922 |
| 194,879 | German | Jan. 30, 1908 |